Oct. 11, 1966   P. FAVROT   3,277,740
DEVICE TO COMPENSATE THE UNBALANCE OF A ROTATING PART
Filed Jan. 14, 1963
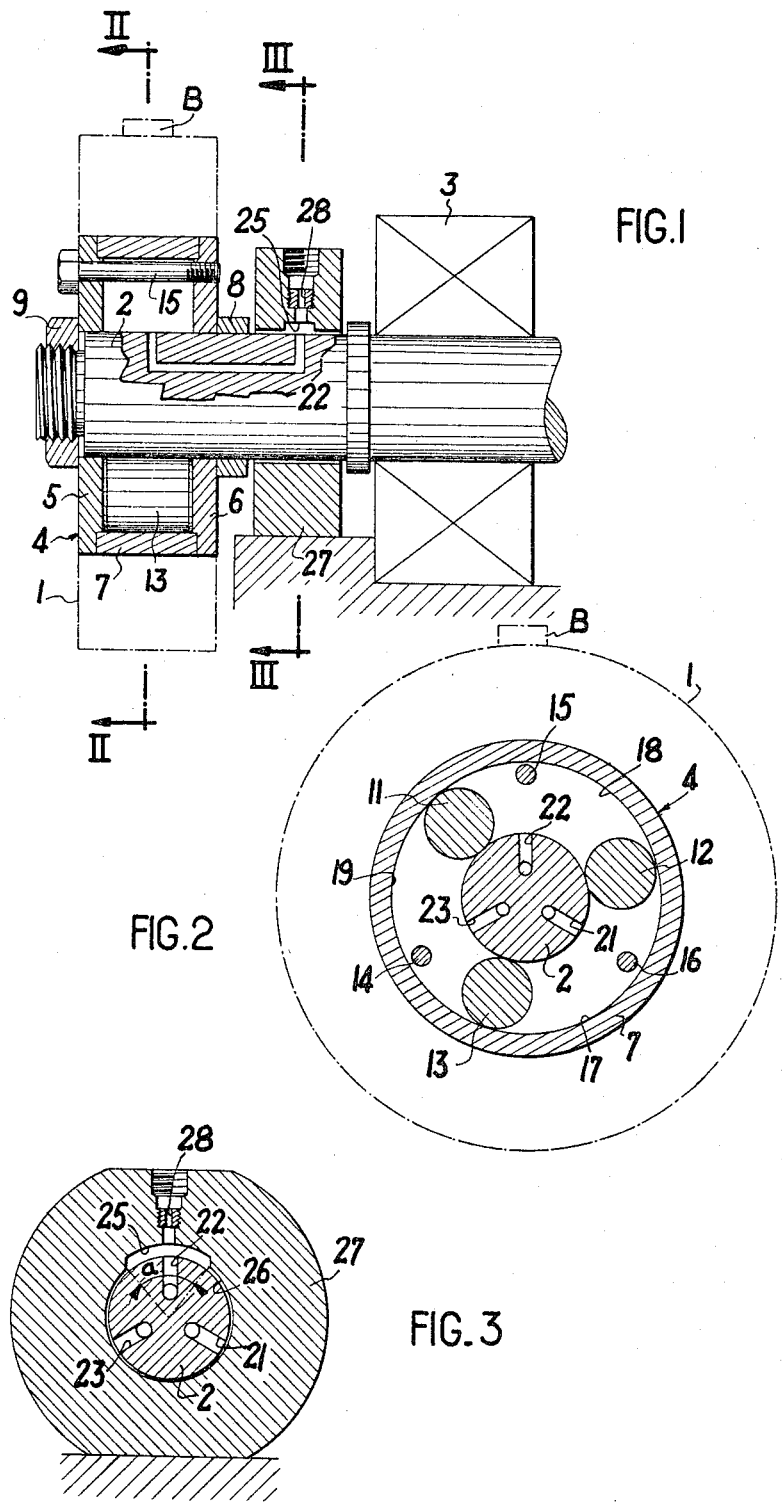

United States Patent Office
3,277,740
Patented Oct. 11, 1966

3,277,740
DEVICE TO COMPENSATE THE UNBALANCE OF A ROTATING PART
Paul Favrot, Lyon, France, assignor, by mesne assignments, to Landis-Gendron S.A., Rhone, France, a company of France
Filed Jan. 14, 1963, Ser. No. 251,296
Claims priority, application France, Jan. 26, 1962, 886,023
6 Claims. (Cl. 74—573)

The present invention relates to a device for compensating the unbalance of a part integral with a shaft rotating in a bearing. The apparatus of the invention is of the type having an annular gas containing chamber between the shaft and the aforesaid part and a plurality of compensation bodies dividing the chamber into compartments. Those bodies are able to move freely to equilibrium positions under the action of the pressure differences in the compartments due to the unbalance to be compensated.

In devices of this type, for example that described in the British patent application No. 5448/62 filed by S.E.E.P.F. on February 13, 1962, for "Dynamic Balancing System for Rotating Structures," the bearing supporting the shaft is of the so-called "fluid" type, i.e. it comprises a plurality of pressure zones distributed over the outer surface of the shaft, and means for feeding these zones with fluid under pressure. In addition, the compartments of the annular chamber of the unbalance compensation device are equal in number to the number of pressure zones of the fluid bearing and are respectively in communication with these zones in such a manner that the differential variations in pressure in the latter, due to the existence of an unbalance of the rotating assembly, are transmitted to the said compartment and cause corresponding displacement of the unbalance compensation bodies to equilibrium positions.

Such fluid bearings, the pressure zones of which are situated on the shaft, are not the best type and it is on the contrary very desirable to use bearings the pressure zones of which are situated in the fixed portion of the bearing. The sensitivity of automatic balancing devices is in fact greater, the less the rigidity of the associated bearings in respect of the dynamic forces, such as those created by an unbalance, but usually mechanisms utilising such balancing devices require great rigidity of the bearings in respect of static forces is required in most cases. Self centering bearings have a very slight rigidity in respect of the dynamic forces and an almost infinite rigidity in respect of static forces. Hence the combination of a self-balancing device with self-centering bearings is particularly advantageous.

The object of the invention is to provide a device of the aforesaid type, which is functionally completely independent of the bearing so that the latter may be of any suitable type and may even not be a fluid bearing if so desired.

A device, according to the invention, comprising an annular chamber mounted on the shaft; gas containing compartments within said chamber; compensation bodies within said chamber bounding said compartments, said compensation bodies being able to move freely into equilibrium positions under the action of pressure differences in said compartments; a stationary part spaced from said annular chamber and closely surrounding said shaft with a clearance between said shaft and said stationary part; a control chamber extending over an arc of the bore of the stationary part; a source of fluid under pressure connected to said control chamber; a communication passage in said shaft between each of said compartments and the part of said shaft covered by said stationary part, said shaft being rotatable independently of said stationary part.

Preferably the annular chamber is mounted between the shaft and the part whose unbalance is to be compensated. With the aid of a structure of this type, compensation of the unbalance is effected by means completely independent of those supporting the rotating shaft, so that it is possible to select at will the said shaft-supporting means and to adapt them in the best possible way to the application concerned.

In one embodiment the fluid under pressure admitted into the pressure connection chamber is a gas, in practice the same gas as that which fills the annular compensation chamber, preferably air.

In another embodiment the fluid under pressure admitted into the pressure connection chamber is a liquid, the annular chamber being sufficiently fluid-tight to retain the gas which is imprisoned therein.

One embodiment of the invention will now be described with reference to the accompanying drawings by way of illustration, in which:

FIGURE 1 is a section through one apparatus according to one embodiment of the invention, for compensating the unbalance of a part integral with a rotating shaft, and FIGURES 2 and 3 are cross-sections taken respectively on the lines II—II and III—III in FIGURE 1.

The part the unbalance of which it is desired to compensate is represented diagrammatically by an annular cylindrical part 1 integral with a rotating shaft 2 mounted rotatably in a bearing 3 of any suitable conventional type. The axis of the rotating shaft is horizontal and the annular part 1 is mounted on one end of the said shaft by means of a hub, which constitutes the operative portion of the unbalance compensation device which is designated generally by 4. This device has two equal discs 5, 6 between which a ring 7 is held, this assembly of three parts being gripped between a ring 8 integral with the shaft 2 and a nut 9 screwed on the threaded end of the said shaft. The annular space bounded by the cylindrical surface of the shaft 2, the inside cylindrical surface of the ring 7, and the two opposite faces of two discs 5 and 6 respectively form an annular chamber of rectangular section in which are disposed a plurality of compensation bodies (three in the example considered), which are constituted by cylindrical rollers 11, 12, 13. The dimensions of these rollers are such that they can move freely in the annular chamber and for this purpose their diameter is very slightly smaller, for example of the order of 2/100 of a mm., than the half-difference in diameter of the shaft and the ring 7; similarly, the length of each roller is very slightly smaller, likewise of the order of 2/100 of a mm., than the distance between the two opposite faces of the two discs 5 and 6.

In the annular chamber the three rollers 11, 12, 13 bound three compensation compartments or chambers 17, 18, 19, which are respectively in communication with three bent passages 21, 22, 23 formed in the shaft 2 and leading on to the cylindrical surface of the shaft at a point corresponding to a pressure connection chamber 25 which extends over an arc $a$ of the bore 26 of a fixed part 27 which is functionally independent of the bearing and surrounds the shaft with a slight clearance. The pressure connection chamber 25 is connected to a source (not illustrated) of gas, for example air, under pressure through the medium of a constriction, shown as a jet 28.

Stops 14, 15, 16 disposed against the inside cylindrical face of the ring 7 limit in a positive manner the displacements of the compensation rollers to an arc of 120° approximately, in order that the same compensation chamber cannot be fed with fluid under pressure by two radial passages simultaneously, which would completely compromise the operation of the apparatus.

The operation of the apparatus is as follows:

In the course of one revolution of the shaft 2, any of the three radial passages, for example the passage 22, is in communication with the source of gas under pressure while the shaft pivots through an angle $a$. During this time, the pressure prevailing in this passage and in the compartment of 18 of the annular chamber depends on the value of the clearance which exists between the cylindrical surface of the shaft and the bore 26 in the fixed part 27, this pressure being higher, the smaller the said clearance.

Immediately after the passage 22 ceases to be in communication with the pressure connection chamber 25 and throughout the time during which the shaft pivots by the angle ($2\pi-a$), the space constituted by the compartment 18 and the passage 22 communicates with the atmosphere through the clearance which exists between the cylindrical surface of the shaft and the bore 26 of the fixed part 27 near the aperture through which the said passage leads on to the cylindrical surface of the shaft.

The pressure which prevails in this space therefore reduces while the shaft travels through the angle ($2\pi-a$), since gas escapes trough this clearance, but the smaller this clearance the less it will decrease.

The same phenomenon is repeated on each revolution of the shaft, so that the mean pressure during one revolution will in the space considered tend towards a stable value which will be the higher, the smaller the clearance.

If there exists an unbalance, such as B for example, in a given direction, the pressure which prevails in the compartment 18, comprised between two rollers, for example 11 and 12, separated by the stop 15 nearest to the half-plane containing the unbalance B is higher than the pressure prevailing in the other two compartments 17 and 19. The two rollers 11 and 12 therefore tend to move away from one another and consequently to reduce the unbalance. The position of equilibrium of the assembly of three rollers is therefore that at which the resulting unbalance is zero.

The invention is obviously not limited to the embodiment described and illustrated which has been given by way of example, but numerous modifications may be made to it depending on the applications envisaged, without thereby departing from the scope of the invention.

Thus for example, instead of supplying the pressure connection chamber 25 with a gas, it could be supplied with liquid without thereby altering the unbalance compensation process, provided that the assembly is designed and arranged so that the air contained in the device cannot escape, the compartments of the annular chamber then retaining sufficient gas to act as an accumulator.

I claim:

1. A device for compensating the unbalance of a part fixed to a rotatable shaft comprising an annular chamber mounted on the shaft; gas containing compartments within said chamber; compensation bodies within said chamber bounding said compartments, said compensation bodies being able to move freely into equilibrium positions under the action of pressure differences in said compartments; a stationary part spaced from said annular chamber and closely surrounding said shaft with a clearance between said shaft and said stationary part; a single control chamber extending over an arc of the bore of the stationary part; a source of fluid under pressure connected to said control chamber; respective communication passages in said shaft connecting each of said compartments with the clearance between said shaft and said stationary part in a same radial plane which includes said control chamber, said passages being angularly spaced apart whereby pursuant to rotation of said shaft they singly successively open into said control chamber while the others of said passages open into said clearance said shaft being supported independently of said stationary part.

2. A device according to claim 1, wherein said source of fluid comprises a source of gas.

3. A device according to claim 2, in which the gas in said source of gas under pressure is air.

4. A device according to claim 2, in which the gas under pressure and the gas in said gas containing compartments are the same.

5. A device for compensating the unbalance of a part fixed to a rotatable shaft comprising an annular chamber mounted on the shaft; gas containing compartments within said chamber; compensation bodies within said chamber bounding said compartments; said compensation bodies being able to move freely into equilibrium positions under the action of pressure differences in said compartments; a stationary part spaced from said annular chamber and closely surrounding said shaft with a clearance between said shaft and said stationary part; a single control chamber extending over an arc of the bore of the stationary part; a source of liquid under pressure connected to said control chamber, said annular chamber being sufficiently fluid-tight to retain the gas imprisoned therein; a single communication passage in said shaft connecting each of the compartments and the said control chamber covered by said stationary part, said shaft being supported independently of said stationary part, said passageways being so spaced around the periphery of said shaft that said control chamber is successively connected to only one of said compartments at a time during the rotation of said shaft.

6. The combination with a body rotatable about its axis and having a shaft rotatably mounted in a bearing, a plurality of balancing inertia masses movable within a race concentric with and movable with said shaft, said inertia masses dividing said race into a plurality of arcuate chambers containing each a compressible fluid, and a single conduit means leading from each of said arcuate chambers to circumferentially spaced openings at the surface of said shaft, of a stationary member having an inner cylindrical wall surrounding a length portion of said shaft with a clearance space therebetween, said shaft length portion including said openings, a single recess formed in said wall in the same transverse plane as said openings and extending over a limited portion of the circumference of said shaft, a source of pressurized fluid leading into said recess, said openings being angularly spaced apart whereby only one thereof opens into said recess at a time while the others of said openings simultaneously open into said clearance space.

References Cited by the Examiner

UNITED STATES PATENTS

| | | | |
|---|---|---|---|
| 2,659,243 | 11/1953 | Darrieus | 74—573 |
| 2,778,243 | 1/1957 | Darrieus | 74—573 |
| 2,877,644 | 3/1959 | Beil et al. | 74—573 |
| 2,963,914 | 12/1960 | Dupouy | 74—573 |
| 2,974,801 | 3/1961 | Bernstein | 74—573 |

FRED C. MATTERN, JR., *Primary Examiner.*

BROUGHTON G. DURHAM, *Examiner.*

W. S. RATLIFF, JR., *Assistant Examiner.*